(12) United States Patent
Chou et al.

(10) Patent No.: US 8,295,011 B2
(45) Date of Patent: Oct. 23, 2012

(54) SLIDER, HEAD GIMBAL ASSEMBLY AND DISK DRIVE UNIT WITH THE SAME

(75) Inventors: Shenkuang Chou, Hong Kong (CN); Lu Xiao, DongGuan (CN); Juren Ding, DongGuan (CN); Kayip Wong, Hong Kong (CN); Yanbin Wang, DongGuan (CN); Liping Peng, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 363 days.

(21) Appl. No.: 12/662,502

(22) Filed: Apr. 20, 2010

(65) Prior Publication Data
US 2011/0194208 A1   Aug. 11, 2011

(30) Foreign Application Priority Data
Feb. 10, 2010 (CN) .......................... 2010 1 0119175

(51) Int. Cl.
  *G11B 5/455* (2006.01)
  *G11B 5/31* (2006.01)
  *G11B 5/60* (2006.01)
(52) U.S. Cl. .................................................. 360/234.5
(58) Field of Classification Search ............... 360/234.5, 360/235.7, 236.5
See application file for complete search history.

(56) References Cited

U.S. PATENT DOCUMENTS

| | | | | |
|---|---|---|---|---|
| 4,648,087 A | * | 3/1987 | Scranton et al. | 360/234.7 |
| 6,046,596 A | * | 4/2000 | Schaenzer et al. | 324/662 |
| 7,643,250 B2 | * | 1/2010 | Araki et al. | 360/234.5 |
| 7,929,248 B2 | * | 4/2011 | Zhu et al. | 360/234.5 |
| 7,952,833 B2 | * | 5/2011 | Smith | 360/234.5 |
| 8,125,734 B2 | * | 2/2012 | Umezaki et al. | 360/234.5 |
| 8,174,793 B2 | * | 5/2012 | Hasegawa et al. | 360/234.5 |
| 2008/0062565 A1 | * | 3/2008 | Umezaki et al. | 360/234.3 |
| 2011/0146059 A1 | * | 6/2011 | Iwama | 29/603.07 |
| 2012/0036706 A1 | * | 2/2012 | Lau et al. | 29/603.01 |

FOREIGN PATENT DOCUMENTS

JP          08203031 A   *   8/1996

OTHER PUBLICATIONS

English-machine translation of JP 08-203031 A to Boku, published on Aug. 9, 1996.*

* cited by examiner

*Primary Examiner* — Will J Klimowicz
(74) *Attorney, Agent, or Firm* — Nixon & Vanderhye PC (57) ABSTRACT

A slider for a head gimbal assembly includes a trailing surface, a plurality of connection pads arranged on the trailing surface adapted for both bonding the slider to a suspension of the head gimbal assembly and testing the performance of the slider. At least a part of the connection pads each comprises a bonding portion and a testing portion electrically connected to the bonding portion and larger than the bonding portion, all the bonding portions and the rest part of the connection pads are arranged in a first row and the testing portions are arranged outside the first row. The slider of the present invention has a new pad layout to facilitate bonding of the connection pads and permit to provide additional pads thereon to connect the additional sensors therein for precise reading and writing, thereby improving the performance of the slider. The invention also discloses a head gimbal assembly and a disk drive unit including the same.

20 Claims, 8 Drawing Sheets

SLIDER, HEAD GIMBAL ASSEMBLY AND DISK DRIVE UNIT WITH THE SAME

This application claims priority to Chinese Application No. 201010119175.6 filed Feb. 10, 2010, the entire contents of which are hereby incorporated by reference in this application.

FIELD OF THE INVENTION

The present invention relates to magnetic hard disk drive device and, more particularly, to a slider with a new pad layout, head gimbal assembly and disk drive unit with the same.

BACKGROUND OF THE INVENTION

One known type of information storage device is a disk drive device that uses magnetic media to store data and a movable read/write head that is positioned over the magnetic media to selectively read from or write to the magnetic media.

Figure 1:
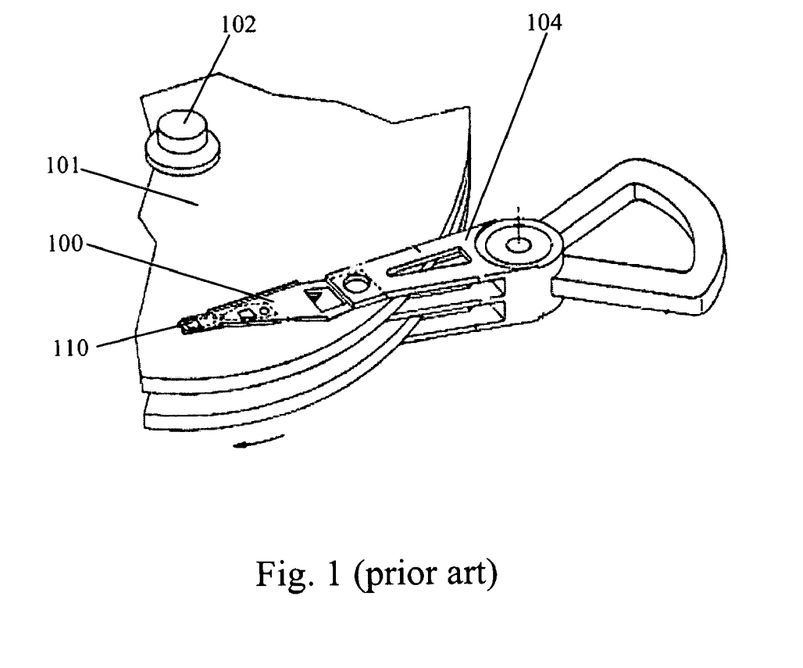
FIG. 1 is a partial perspective view of a conventional disk drive unit.

FIG. 1 illustrates a conventional disk drive device and show a magnetic disk 101 mounted on a spindle motor 102 for spinning the disk 101. A voice coil motor arm 104 carries a head gimbal assembly (HGA) 100 that includes a slider 110 incorporating a read/write head. A voice-coil motor (VCM, not labeled) is provided for controlling the motion of the motor arm 104 and, in turn, controlling the slider 110 to move from track to track across the surface of the disk 101, thereby enabling the read/write head to read data from or write data to the disk 101. In operation, a lift force is generated by the aerodynamic interaction between the slider 110, incorporating the read/write head, and the spinning magnetic disk 101. The lift force is opposed by equal and opposite spring force which is applied by the HGA 100 such that a predetermined flying height above the surface of the spinning disk 101 is maintained over a full radial stroke of the motor arm 104.

Figure 2A:
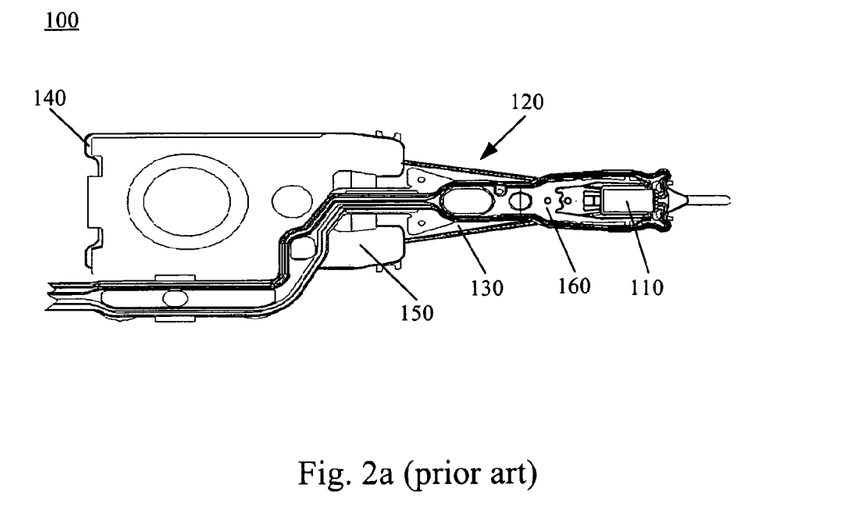
FIG. 2a is a partial top plan view of a conventional HGA.
Figure 2B:
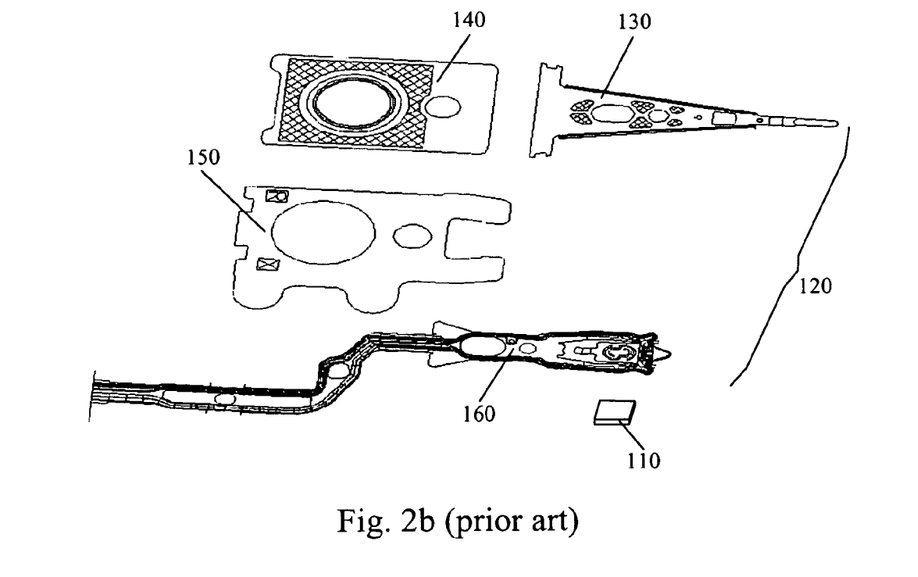

Now referring to FIG. 2a and FIG. 2b, the conventional HGA 100 includes a slider 110 having a reading/writing head imbedded therein, a suspension 120 to load or suspend the slider 110 thereon. As illustrated, the suspension 120 includes a load beam 130, a base plate 140, a hinge 150 and a flexure 160, all of which are assembled together.

Figure 3A:
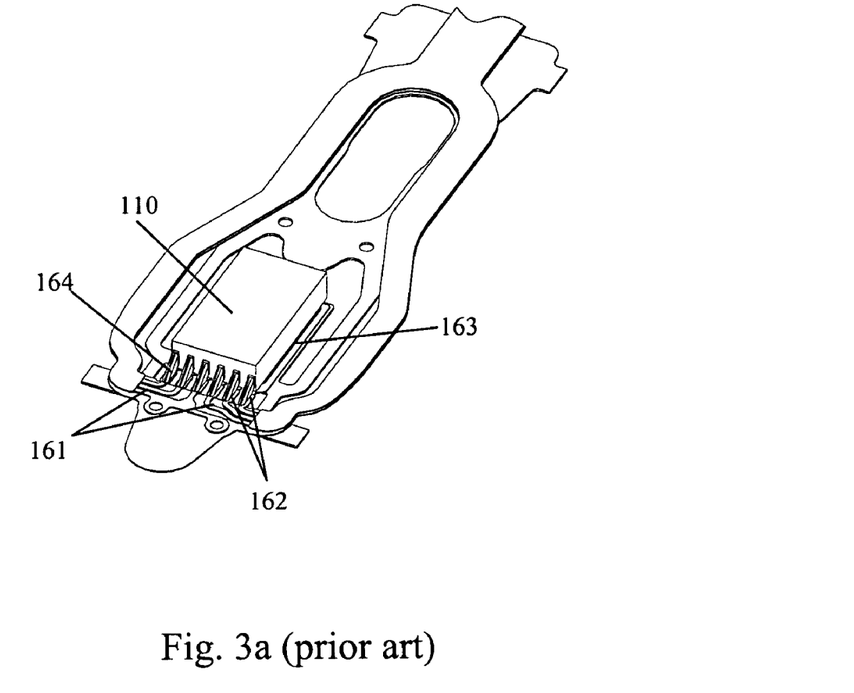
Figure 3B:
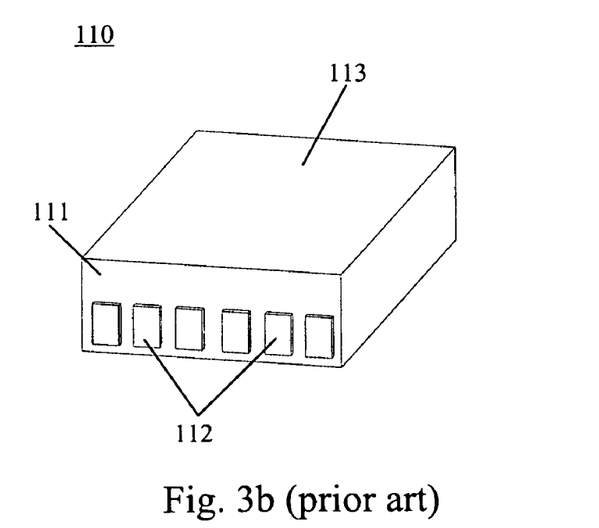

As illustrated in FIG. 3a and FIG. 3b, pluralities of electrical traces 161 are formed on the flexure 160 along length direction thereof. One end of the electrical traces 161 are electrically connected to six electrical pads 162 which are formed on the suspension tongue 163, and the other end of the electrical traces 161 are electrically connected to an outer control system (not shown). A trailing surface 111 of the slider 110 has six connection pads 112 corresponding to the six electrical pads 162. Concretely, the connection pads 112 are electrically connected to the electrical pads 162 by solder joints 164, thus connected to the electrical traces 161, thereby electrically connecting the slider 110 to the electrical traces 161. After the slider 110 mounted on the suspension tongue 163 and electrically coupled with the electrical pads 162 by the connection pads 112, the outer control system can control the slider 110, thus realizing data reading/writing operation with respect to the disks 101.

As indicated above, the number of the connection pads 112 formed on the trailing surface 111 of the slider 110 is six. The connection pads 112 are arranged to be one row and adjacent to a mounting surface which face to the suspension tongue 163 for bonding with the electrical pads 162 disposed on the suspension tongue 163 and testing the performance of the slider before bonding. And all of the connection pads 112 are used to electrically connect the inner sensors of the slider 110 to an outer control system (not shown) by the electrical traces 161. Concretely, there are three inner sensors embedded into the slider 110. Every two connection pads 112 are connected to one inner sensor. Wherein one pair of the connection pads 112 are electrically connected to a read head (not shown) adapted for reading data from the disk, another pair of pads 112 are electrically connected to a write head (not shown) adapted for writing data to the disk, and the other two connection pads 112 are electrically connected to a thermal resistance to heat the pole tip formed on an air bearing surface 113 of the slider 110 which facing to the disk 101 and then make the pole tip extrude, thereby improving the precision of reading and writing of the slider 110.

However, on one hand, the slider is required to become more and more smaller. This, in turn will result in smaller space between the connection pads. While bonding the connection pads to the electrical pads of the suspension tongue, the precision control is required to prevent short circuit. That is to say, it becomes difficult to bond the smaller slider to the suspension.

On the other hand, consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device has a corresponding increase in the positional control of the read/write head in order to enable quick and accurate reading and writing operations using the higher density disks. As the track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increase in track density.

One approach that has been effectively used by disk drive manufacturers to improve the positional control of read/write heads for higher density disks is to adopt a series of sensors, such as vibration sensor, head disc interface sensor (HDI sensor) and so on. If the additional sensors are set outside the slider, the electrical signal of the sensors will be delayed inevitably as a result the slider can not be adjusted in time. Thus it requests all the increased sensors to be set inside the slider to improve the performance of the slider.

However, more sensors are embedded into the slider, more connection pads need to be disposed on the slider. But the slider is limited to 700 μm in width at present, and it requests to keep enough space between each two connection pads to prevent short circuit. Furthermore, in order to meet the request of bonding, the connection pads must be arranged to be one row, and in order to meet the request of testing, the dimension of each connection pad is limited to 60 μm×60 μm at least. Therefore, conventional layout of the connection pads makes the slider difficult to provide additional pads thereon.

Accordingly, it is desired to provide a slider with a new pad layout to facilitate bonding of the connection pads and permit to provide additional pads thereon to connect the additional sensors therein for precise reading and writing to overcome the above-mentioned drawbacks.

SUMMARY OF THE INVENTION

One objective of the present invention is to provide a slider with a new pad layout to facilitate bonding of the connection pads and permit to provide additional pads thereon to connect the additional sensors therein for precise reading and writing, thereby improving the performance of the slider.

Another objective of the present invention is to provide a HGA including a slider with a new pad layout to facilitate bonding of the connection pads and permit to provide additional pads thereon to connect the additional sensors therein for precise reading and writing, thereby improve the performance of the slider.

Yet another objective of the present invention is to provide a disk drive unit including a slider with a new pad layout to facilitate bonding of the connection pads and permit to provide additional pads thereon to connect the additional sensors therein for precise reading and writing, thereby improving the performance of the slider to meet the performance necessary of the disk drive unit.

To achieve above objectives, a slider for a head gimbal assembly includes a trailing surface, a plurality of connection pads arranged on the trailing surface adapted for both bonding the slider to a suspension of the head gimbal assembly and testing the performance of the slider. At least a part of the connection pads each includes a bonding portion and a testing portion electrically connected to the bonding portion and larger than the bonding portion, all the bonding portions and the rest part of the connection pads are arranged in a first row and the testing portions are arranged outside the first row.

As an embodiment of the present invention, the rest part of the connection pads each has the same dimension as the testing portion.

As another embodiment of the present invention, the bonding portions and the rest part of the connection pads are arranged alternately. Preferably, the testing portions are arranged in a second row.

As still another embodiment of the present invention, the testing portions are arranged in a plurality of rows.

As yet another embodiment of the present invention, the bonding portions, the testing portions, and the rest part of the connection pads have the same layer structure. Preferably, the layer structure includes a copper stud, a titanium or tantalum layer, a nickel-iron alloy layer and a gold layer.

A head gimbal assembly of the present invention includes a suspension having a suspension tongue with a plurality of electrical pads and a slider mounted on the suspension tongue, which includes a trailing surface, a plurality of connection pads arranged on the trailing surface adapted for both bonding the slider to a suspension of the head gimbal assembly and testing the performance of the slider. At least a part of the connection pads each includes a bonding portion and a testing portion electrically connected to the bonding portion and larger than the bonding portion, all the bonding portions and the rest part of the connection pads are arranged in a first row and the testing portions are arranged outside the first row.

A disk drive unit of the present invention includes include a head gimbal assembly including a suspension having a suspension tongue with a plurality of electrical pads and a slider mounted on the suspension tongue, a drive arm connected to the head gimbal assembly, a disk and a spindle motor operable to spin the disk. The slider includes a trailing surface, a plurality of connection pads arranged on the trailing surface adapted for both bonding the slider to a suspension of the head gimbal assembly and testing the performance of the slider. At least a part of the connection pads each includes a bonding portion and a testing portion electrically connected to the bonding portion and larger than the bonding portion, all the bonding portions and the rest part of the connection pads are arranged in a first row and the testing portions are arranged outside the first row.

In comparison with the prior art, the slider of the present invention includes a plurality of connection pads, each of which includes a bonding portion and a testing portion. The bonding portions and the testing portions are not arranged in a same row. Since the bonding portion is provided just for bonding, it can be designed to be a smaller size that just enough for bonding. Therefore, on one hand, the space between the bonding portions can be enlarged to facilitate the bonding; on the other hand, the trailing surface of the slider can be placed more connection pads thereon, thereby improve the performance of the slider.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2b is an exploded perspective view of the HGA shown in FIG. 2a;

FIG. 3a is a partial perspective view of the HGA shown in FIG. 2a;

FIG. 3b is a perspective view of a slider of the HGA shown in FIG. 3a;

FIG. 4b is an exploded view of the HGA shown in FIG. 4a;

FIG. 5 is a perspective view of the HGA shown in FIG. 4a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a slider for a HGA of a disk drive unit, which includes a trailing surface, a plurality of connection pads arranged on the trailing surface adapted for both bonding the slider to a suspension of the head gimbal assembly and testing the performance of the slider. At least a part of the connection pads each includes a bonding portion and a testing portion electrically connected to the bonding portion and larger than the bonding portion, all the bonding portions and the rest part of the connection pads are arranged in a first row and the testing portions are arranged outside the first row. The slider of the present invention includes a plurality of connection pads, each of which includes a bonding portion and a testing portion. The bonding portions and the testing portions are not arranged in a same row. Since the bonding portion is provided just for bonding, it can be designed to be a smaller size that just enough for bonding. Therefore, on one hand, the space between the bonding portions can be enlarged to facilitate the bonding; on the other hand, the trailing surface of the slider can be placed more connection pads thereon, thereby improving the performance of the slider. Several example embodiments of the slider, a head gimbal assembly (HGA) with such a slider of the invention will now be described.

Figure 4A:
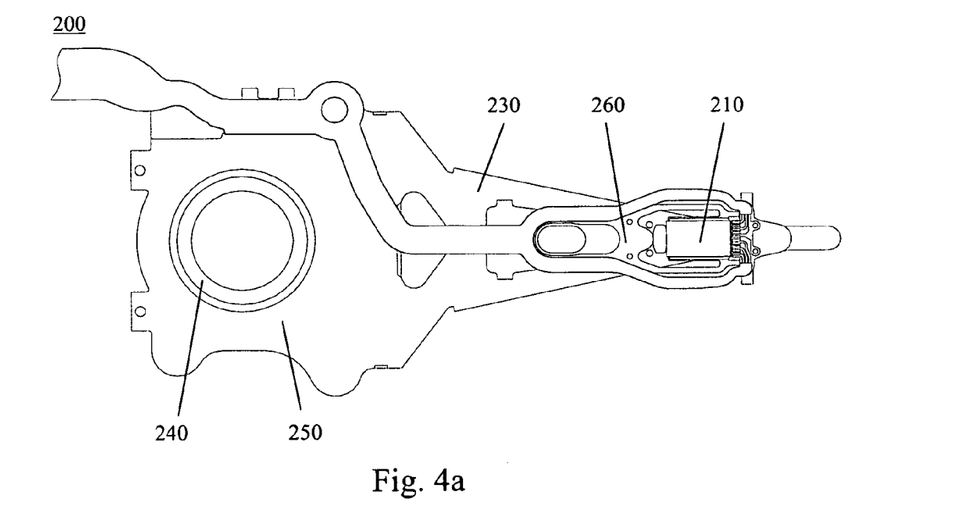
FIG. 4a is a top plan view of a HGA according to a first embodiment of the present invention.
Figure 4B:
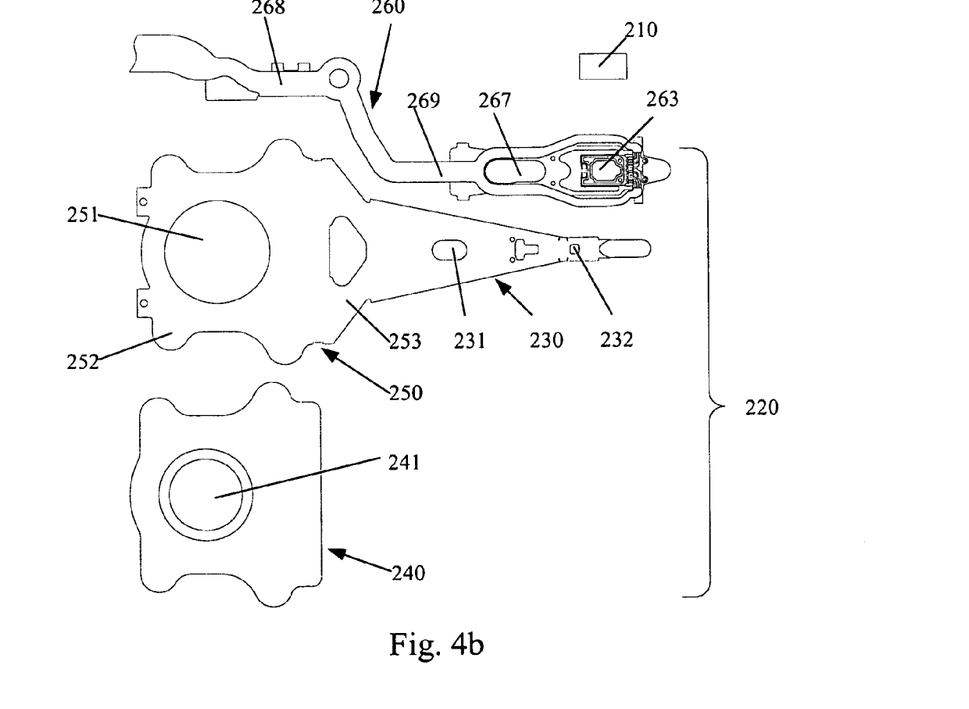

FIG. 4a-4b show a detail structure of an embodiment of a HGA of the present invention. Now referring to FIG. 4a and FIG. 4b, a HGA 200 of the present invention includes a slider 210 and a suspension 220 supporting the slider 210. The suspension 220 includes a load beam 230, a base plate 240, a hinge 250, a flexure 260, and, all of which are assembled with each other.

The load beam 230 is connected to the base plate 240 by the hinge 250. A locating hole 231 is formed on the load beam 230 for aligning the load beam 230 with the flexure 260. As best shown in FIG. 4b, a dimple 232 is formed on the load beam 230 to transfer the load forces generated by the load beam 230 to the flexure 260 at a position corresponding to a center of the slider 210. By this engagement of the dimple 232 with the flexure 260, the load forces can be transferred to the slider 210 uniformly, thus making the slider 210 working more stably.

The base plate 240 is used to enhance the structure stiffness of the whole HGA 200. A mounting hole 241 is formed on end of the base plate 240 for mounting the whole HGA 200 to a motor arm (not shown). The hinge 250 has a mounting hole 251 formed on its one end corresponding to the mounting hole 241 of the base plate 240, and the hinge 250 is partially mounted to the base plate 240 with the mounting holes 241, 251 aligned with each other. The hinge 250 and the base plate 240 may be mounted together by laser welding. Two hinge steps 252 are integrally formed at two sides of the hinge 250 at one end adjacent to the mounting hole 251 for strengthening the stiffness of the hinge 250. In addition, two hinge struts 253 are extended from the other end of the hinge 250 to partially mount the hinge 250 to the load beam 230. In this embodiment, the hinge 250 is integrally formed with the base load beam 230.

The flexure 260 runs from the hinge 250 to the load beam 230. The flexure 260 has a proximal end 268 adjacent to the hinge 250 and a distal end 269 adjacent to the load beam 230. The flexure 260 of the suspension 220 has a suspension tongue 263 on which almost an entire surface of one face of the slider 210 is fixed. A locating hole 267 is formed on the distal end 269 of the flexure 260 and aligned with the locating hole 231 of the load beam 230, thus obtaining a high assembly precision.

Figure 5:
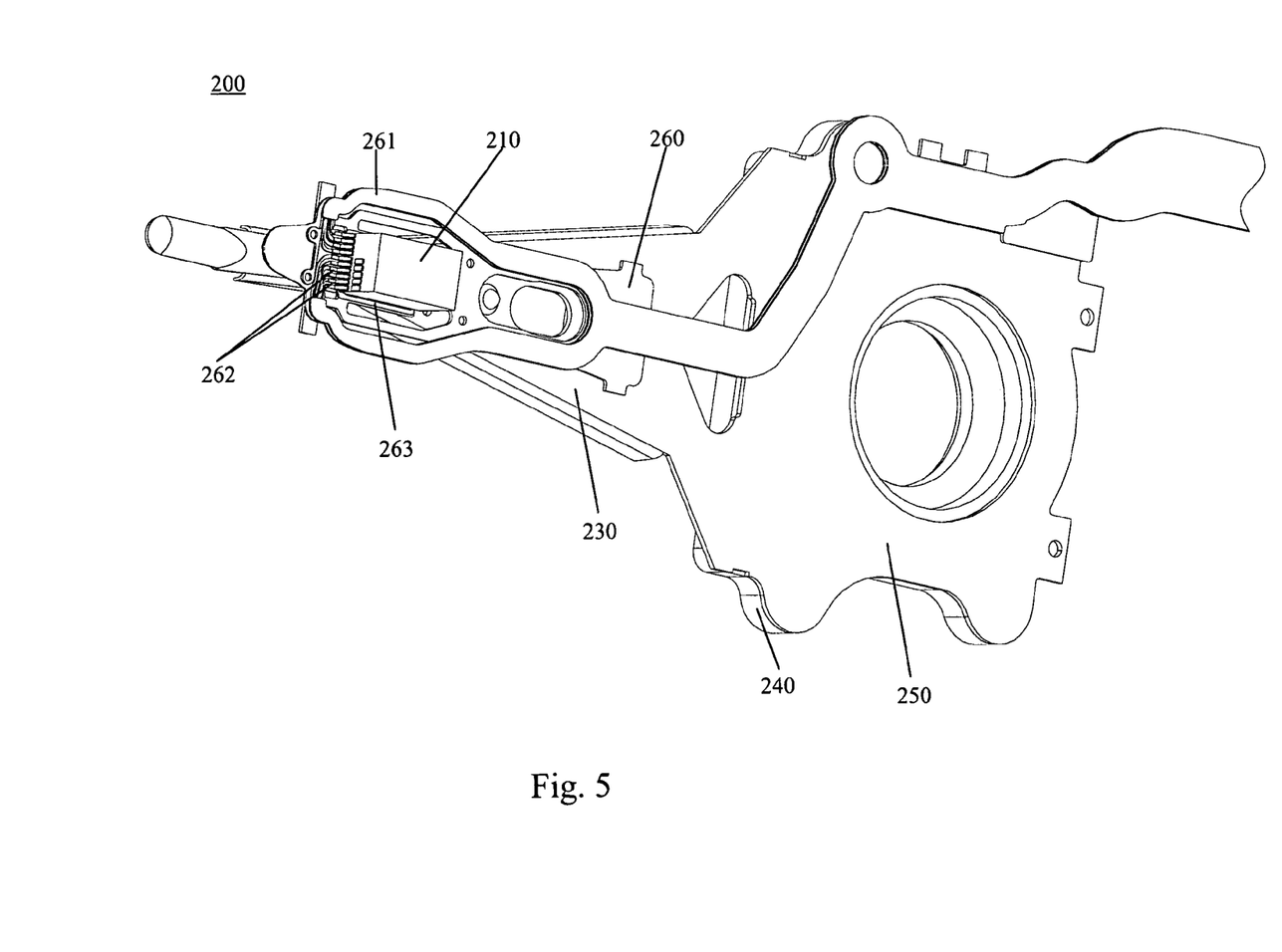

FIG. 5 is a perspective view of the HGA shown in FIG. 4a. Referring to FIG. 5, a plurality of electrical traces 261 is formed on the flexure 260. One end of the electrical traces 261 are electrically connected to ten electrical pads 262 which are formed on the suspension tongue 263 and another end of the electrical traces 261 are electrically connected to an outer control system (not shown).

Figure 6:
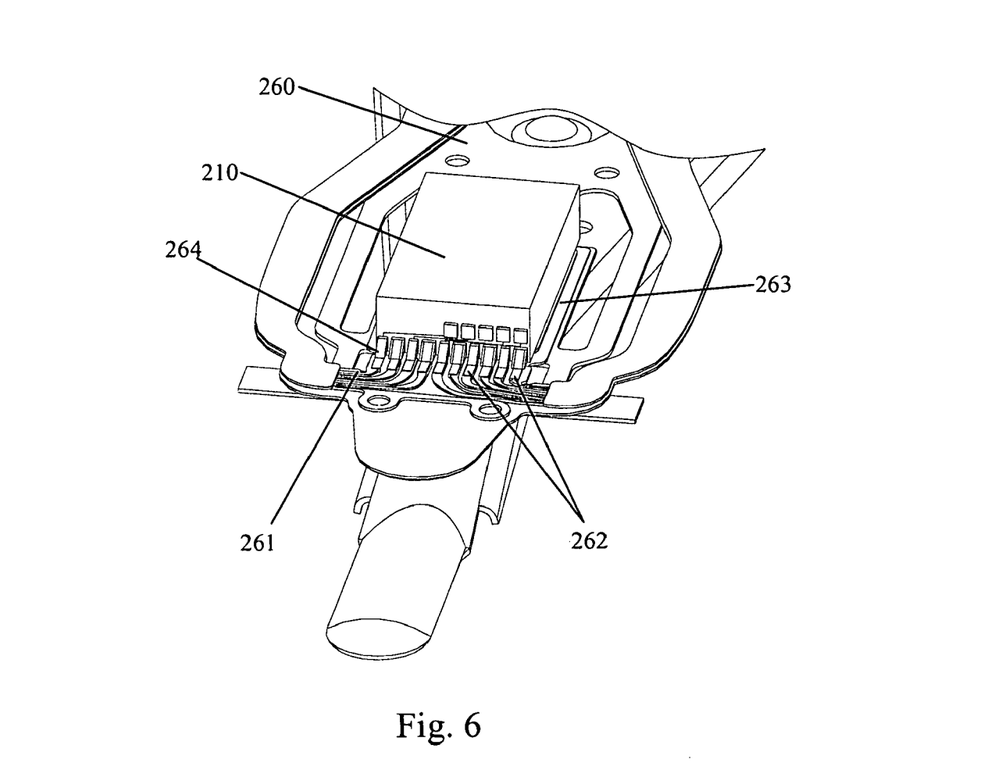
FIG. 6 is a partially enlarged view of the HGA shown in FIG. 5.
Figure 7:
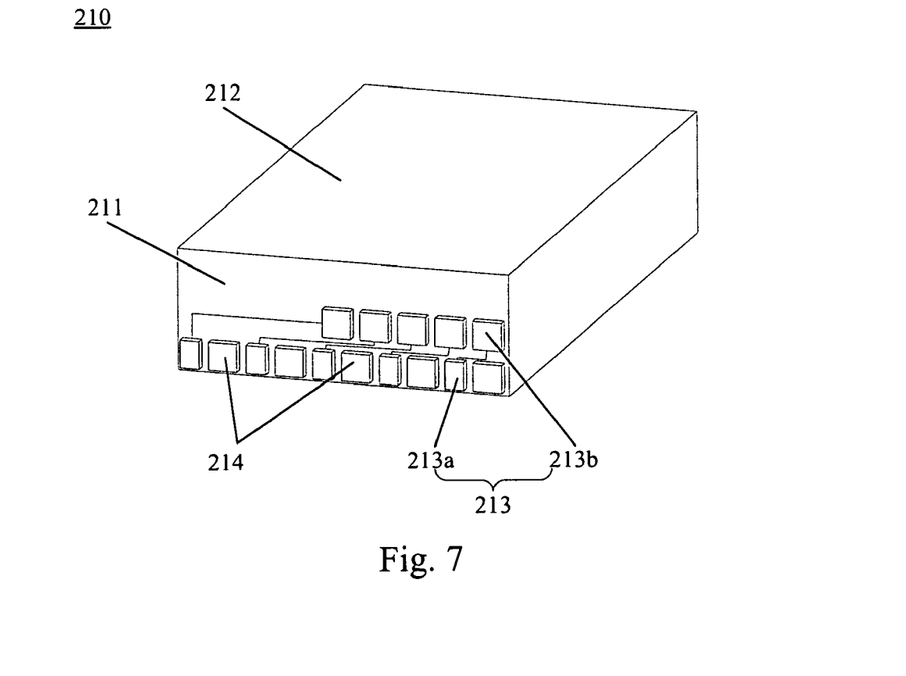
FIG. 7 is a perspective view of a slider of the HGA shown in FIG. 5.

Now referring to FIG. 6 and FIG. 7, the slider 210 mounted on the suspension tongue 263 includes a trailing surface 211, a mounting surface and an air bearing surface 212 opposite to the mounting surface. The mounting surface is bonded to the suspension tongue 263 by epoxy or other adhesive materials. The slider 210 further includes a plurality of connection pads arranged on the trailing surface 211. A part of the connection pads are first connection pads 213, and the rest part of the connection pads are second connection pads 214. Each first connection pads 213 includes a bonding portion 213a for bonding and a testing portion 213b electrically connected to the bonding portion 213a for testing. All the bonding portions 213a and the second connection pads 214 are arranged in a first row adjacent to the mounting surface of the slider 210 for bonding with the electrical pads 262 of the suspension tongue 263 by solder joints 264 so as to electrically connect the inner sensor of the slider to the outer control system (not shown). Preferably, the bonding portions 213a and the second connection pads 214 are arranged alternately. While the testing portions 213b are arranged outside the first row. Preferably, the testing portions 213b are arranged in a second row adjacent to the air bearing surface 212 of the slider 210 in order to facilitate the testing of the first connection pads 213. The second connection pad 214 have the same dimension as the testing portion 213b for both bonding and testing. Thus, each combination of the bonding portion 213a and the testing portion 213b has the same function as each second connection pad 214.

Since the bonding portion 213a is disposed just for bonding, it does not need to be designed as big as the testing portion 213b. Thus, the bonding portion 213a can be designed to be a smaller size that just enough for bonding. Therefore, on one hand, the space between the bonding portion 213a and the second connection pad 214 can be enlarged to facilitate the bonding. On the other hand, the trailing surface can be placed more connection pads thereon. In this embodiment, the width of the bonding portion 213a is half as that of the testing portion 213b. There are five first connection pads 213 and five second connection pads 214 disposed on the trailing surface 211 of the slider 210. The total number of the connection pads is ten, so the number of the inner sensors imbedded in the slider 210 can be five. Except the read head, write head and thermal resistance, two additional sensors, such as a vibration sensor and a head disc interface sensor, can be imbedded in the slider 210 to adjust the flying height of the slider 210, thereby improving the precision of reading and writing of the slider 210.

Concretely, the bonding portion 213a, testing portion 213b and the second connection pad 214 have the same layer structure. Preferably, the layer structure include a copper stud, a titanium or tantalum layer, a nickel-iron alloy layer and a gold layer, all of which are coupled with each other. The titanium or tantalum layer is sandwiched between the copper stud and a nickel-iron alloy layer, while the nickel-iron alloy layer is sandwiched between the titanium or tantalum layer and the gold layer which is exposed to be bonded with the solder.

Figure 8:
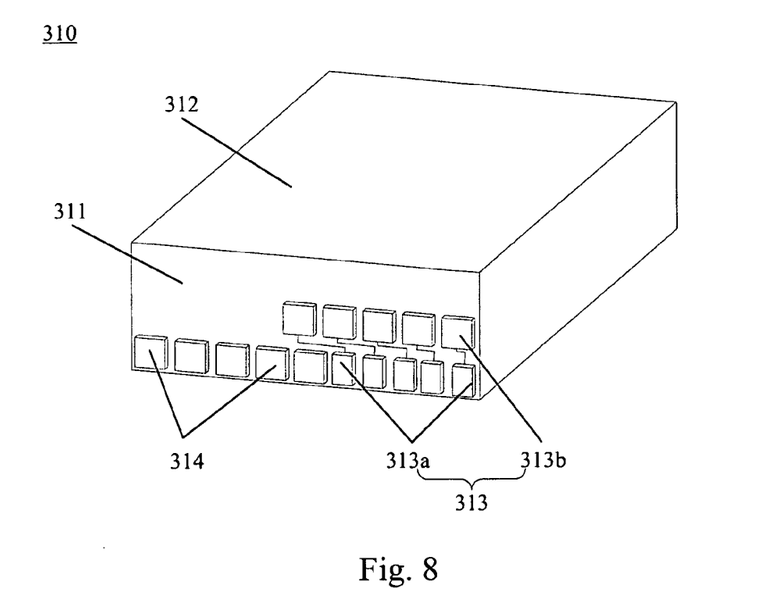
FIG. 8 is a perspective view of a slider according to a second embodiment of the present invention.

FIG. 8 illustrates a slider 310 of a second embodiment according to the present invention. Referring to FIG. 8, as the same with the first embodiment, the slider 310 includes a trailing surface 311, a mounting surface and an air bearing surface 312 opposite to the mounting surface. Wherein the mounting surface is bonded with a suspension tongue by epoxy or other adhesive materials. The slider 310 further includes five first connection pads 313 and five second connection pads 314. Each of the first connection pads 313 includes a bonding portion 313a for bonding and a testing portion 313b electrically connected to the bonding portion 313a for testing. All the bonding portions 313a and the second connection pads 314 are arranged in a row while all the testing portions 313b are arranged in another row. The main distinction between the second embodiment and the first embodiment is that the bonding portions 313a and the second connection pads 314 are not disposed alternately. The five bonding portions 313a are adjacent to each other. The five second connection pads 314 are also adjacent to each other.

Figure 9:
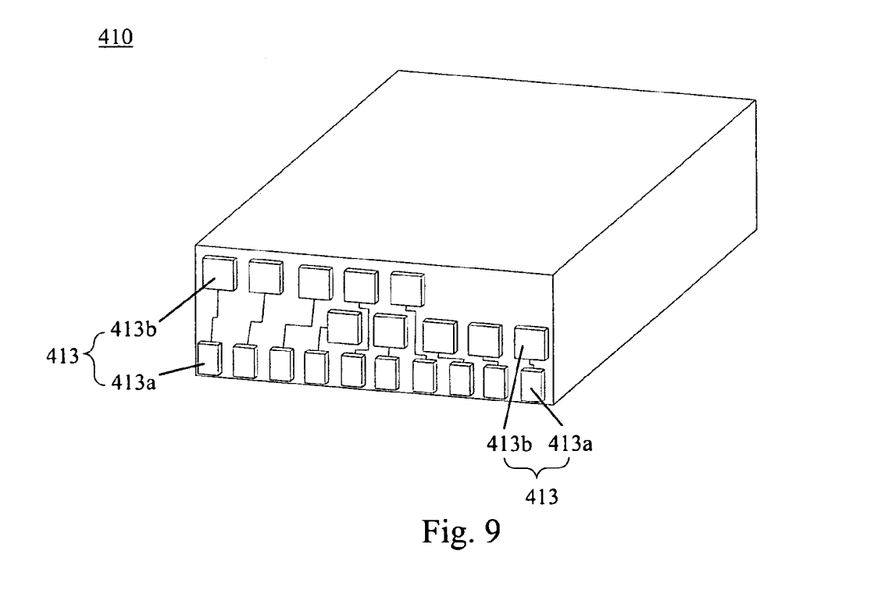
FIG. 9 is a perspective view of a slider according to a third embodiment of the present invention.

FIG. 9 illustrates a slider 410 of a third embodiment according to the present invention. Referring to FIG. 9, the main distinction between the third embodiment and the first embodiment is that the slider of the third embodiment includes ten first connection pads 413 but no second connection pad. Each first connection pads 413 includes a bonding portion 413*a* for bonding and a testing portion 413*b* electrically connected to the bonding portion 413*a* for testing. The ten bonding portions 413*a* are arranged to be a first row adjacent to the mounting surface of the slider 410. While the ten testing portions 413*b* are arranged in two rows, each of which has five testing portions 413*b*.

It should be noted that the slider 210 may be replaced by any one of the slider 310 and 410 which are described in the embodiment motioned above. It also should be noted that the connection pads are not limited to be ten but can be varied according to actual requirement.

Figure 10:
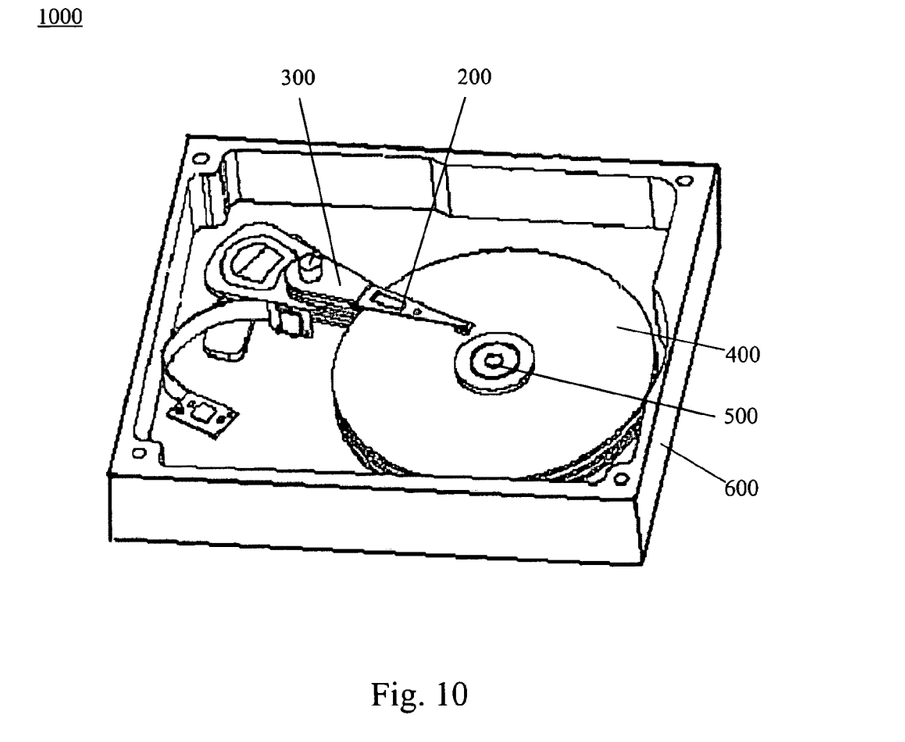
FIG. 10 is a perspective view of a disk drive unit according to an embodiment of the invention.

FIG. 10 is a disk drive unit 1000 according to an embodiment of the invention. The disk drive unit 1000 includes the HGA 200, a drive arm 300 connected to the HGA 200, a series of rotatable disks 400, and a spindle motor 500 to spin the disk 400, all of which are mounted in a housing 600. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A slider for a head gimbal assembly, comprising:
a trailing surface;
a plurality of connection pads arranged on the trailing surface adapted for both bonding the slider to a suspension of the head gimbal assembly and testing the performance of the slider;
wherein at least a part of the connection pads each comprises a bonding portion and a testing portion electrically connected to the bonding portion and larger than the bonding portion, all the bonding portions and the rest part of the connection pads are arranged in a first row, and the testing portions are arranged outside the first row.

2. The slider as claimed in claim 1, wherein the rest part of the connection pads each has the same dimension as the testing portion.

3. The slider as claimed in claim 1, wherein the bonding portions and the rest part of the connection pads are arranged alternately.

4. The slider as claimed in claim 1, wherein the testing portions are arranged in a second row.

5. The slider as claimed in claim 1, wherein the testing portions are arranged in a plurality of rows.

6. The slider as claimed in claim 1, wherein the bonding portions, the testing portions, and the rest part of the connection pads have the same layer structure.

7. The slider as claimed in claim 6, wherein the layer structure comprises a copper stud, a titanium or tantalum layer, a nickel-iron alloy layer and a gold layer.

8. A head gimbal assembly, comprising:
a suspension having a suspension tongue with a plurality of electrical pads; and
a slider mounted on the suspension tongue, comprising:
a trailing surface;
a plurality of connection pads arranged on the trailing surface adapted for both bonding the slider to the suspension and testing the performance of the slider;
wherein at least a part of the connection pads each comprises a bonding portion and a testing portion electrically connected to the bonding portion and larger than the bonding portion, all the bonding portions and the rest part of the connection pads are arranged in a first row, and the testing portions are arranged outside the first row.

9. The head gimbal assembly as claimed in claim 8, wherein the rest part of the connection pads each has the same dimension as the testing portion.

10. The head gimbal assembly as claimed in claim 8, wherein the bonding portions and the rest part of the connection pads are arranged alternately.

11. The head gimbal assembly as claimed in claim 8, wherein the testing portions are arranged in a second row.

12. The head gimbal assembly as claimed in claim 8, wherein the testing portions are arranged in a plurality of rows.

13. The head gimbal assembly as claimed in claim 8, wherein the bonding portions, the testing portions, and the rest part of the connection pads have the same layer structure.

14. The head gimbal assembly as claimed in claim 13, wherein the layer structure comprises a copper stud, a titanium or tantalum layer, a nickel-iron alloy layer and a gold layer.

15. A disk drive unit, comprising:
a head gimbal assembly including a suspension having a suspension tongue with a plurality of connection pads and a slider mounted on the suspension tongue;
a drive arm connected to the head gimbal assembly;
a disk; and
a spindle motor operable to spin the disk;
wherein the slider comprising:
a trailing surface;
a plurality of connection pads arranged on the trailing surface adapted for both bonding the slider to the suspension and testing the performance of the slider;
wherein at least a part of the connection pads each comprises a bonding portion and a testing portion electrically connected to the bonding portion and larger than the bonding portion, all the bonding portions and the rest part of the connection pads are arranged in a first row, and the testing portions are arranged outside the first row.

16. The disk drive unit as claimed in claim 15, wherein the rest part of the connection pads each has the same dimension as the testing portion.

17. The disk drive unit as claimed in claim 15, wherein the bonding portions and the rest part of the connection pads are arranged alternately.

18. The disk drive unit as claimed in claim 15, wherein the testing portions are arranged in a second row.

19. The disk drive unit as claimed in claim 15, wherein the testing portions are arranged in a plurality of rows.

20. The disk drive unit as claimed in claim 15, wherein the bonding portions, the testing portions, and the rest part of the connection pads have the same layer structure.

* * * * *